United States Patent [19]

Kuzuya et al.

[11] Patent Number: 4,911,873
[45] Date of Patent: Mar. 27, 1990

[54] TERMINAL-TREATED EXTRUSION AND THE METHOD OF TERMINAL TREATMENT THEREFOR

[75] Inventors: Yasuhisa Kuzuya; Nobuyoshi Baba, both of Aichi, Japan

[73] Assignee: Toyoda Gosei Co., Ltd., Nishikasugai, Japan

[21] Appl. No.: 133,445

[22] Filed: Dec. 15, 1987

[30] Foreign Application Priority Data

Dec. 15, 1986 [JP] Japan ............................ 61-298311
Dec. 15, 1986 [JP] Japan ...................... 61-192730[U]

[51] Int. Cl.$^4$ ............................................. B29C 47/06
[52] U.S. Cl. ............................. 264/148; 156/245; 264/150; 264/152; 264/153; 264/163; 264/259; 264/267
[58] Field of Search ............... 156/245; 264/138, 148, 264/150, 152, 153, 163, 259, 267

[56] References Cited

U.S. PATENT DOCUMENTS

| | | | |
|---|---|---|---|
| 3,959,538 | 5/1976 | Loew | 52/716 |
| 4,619,847 | 10/1986 | Jackson | 428/31 |
| 4,719,067 | 1/1988 | Thiel | 264/259 |

FOREIGN PATENT DOCUMENTS

| | | | |
|---|---|---|---|
| 0215843 | 12/1984 | Japan | 264/163 |
| 62-41253 | 3/1987 | Japan . | |
| 62-214919 | 9/1987 | Japan . | |
| 2165164 | 4/1986 | United Kingdom . | |

Primary Examiner—Jeffery Thurlow
Attorney, Agent, or Firm—Cushman, Darby & Cushman

[57] ABSTRACT

A method of terminal treatment for an extrusion molding of the present invention including the steps of: applying double-sided adhesive tape to necessary positions of an extrusion molding; cutting the extrusion molding with the double-sided adhesive tape stuck thereon into a necessary length; cutting a release paper of the double-sided adhesive tape into a predetermined length less than the necessary length of the extrusion; and forming a terminal of the extrusion into a predetermined form by injection molding.

5 Claims, 5 Drawing Sheets

TERMINAL-TREATED EXTRUSION AND THE METHOD OF TERMINAL TREATMENT THEREFOR

BACKGROUND OF THE INVENTION

The present invention relates to a method of terminal treatment for extrusions or extruded molding articles, such as car side moldings and the like, and the terminal-treated extrusions Particularly, the present invention relates to a method of terminal treatment for extrusions, such as non-hollow extrusions, hollow extrusions and the like, to be stuck with double-sided adhesive tape, and the terminal-treated extrusions.

A technique, as to a conventional method of terminal treatment for extrusions of this type has been described in Japanese Patent Publication No. 47852/1975.

Figure 11:
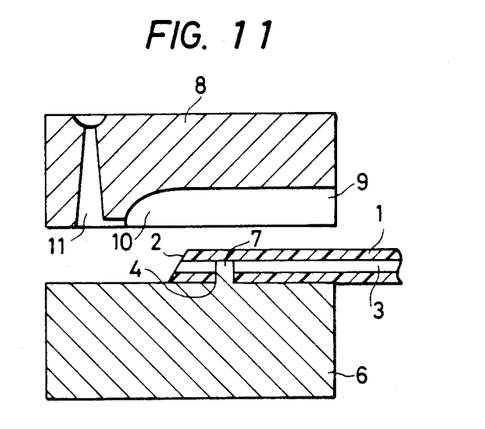
FIG. 11 is a sectional view for explaining the conventional method of terminal treatment for an extrusion.

FIG. 11 is a sectional view for explaining the method of terminal treatment for extrusion moldings or extruded molding articles as described in the above Japanese Patent Publication.

According to the above Publication, a long hollow molding formed of nonrigid vinyl chloride or the like is cut into a predetermined length to prepare a half-finished hollow molding 1. A hole 4 having a width substantially equal to that of a hollow portion 3 of the half-finished molding 1 is formed in a half-finished molding 1 at a position near to a terminal of the molding 1, so that the hole 4 can be communicated with the hollow portion 3.

On the other hand, a male metal mold 6 and a female metal mold 8 are provided. The male metal mold 6 has a pin 7 which can fit into the hole 4 to thereby block the hollow portion 3 of the half-finished hollow molding 1. The female metal mold 8 has a groove 9 for airtightly covering the upper-side outer surface of the half-finished hollow molding 1, and a concave portion 10 formed at an inner place continuously to the groove 9 so as to be adjusted to the shape of a finished article.

The female metal mold 8 is combined with the male metal mold 6, so that the terminal 2 of the half-finished hollow molding 1 is put between the male and female metal molds 6 and 8. At the same time, a cavity is formed by the concave portion 10, the upper surface of the male metal mold 6, the pin 7 and the terminal 2 of the half-finished hollow molding 1.

A molding material, such as nonrigid vinyl chloride or the like, is injected from an injection nozzle of an injection molding apparatus, so that the cavity is filled with the molding material through a gate 11 or the like. After the molding material is hardened, the gate 11 is removed with mold release to thereby prepare a half-finished hollow molding 1 having a new terminal of a predetermined shape.

Double-sided adhesive tape being cut into a predetermined length is applied to the thus prepared half-finished hollow molding 1 having the new terminal of the predetermined shape, so that the terminal-treated hollow molding can be stuck to a car or the like in use.

In short, the conventional method of terminal treatment for extrusions comprises the steps of cutting an extrusion into predetermined length, reforming a terminal of the extrusion with injection molding method, and applying double-sided adhesive tape of a predetermined length to the extrusion after reforming the terminal. Accordingly, the conventional method involves problems that the step of applying double-sided adhesive tape of a predetermined length must be carried out by manual labor or by use of a precision machine for applying double-sided adhesive tape, and in that a large number of work steps must be required for carrying out the terminal treatment.

SUMMARY OF THE INVENTION

It is therefore an object of the present invention to eliminate the aforementioned disadvantage in the prior art.

It is, therefore, an object of the present invention to provide a method of terminal treatment for an extrusion or extruded molding article, in which the number of work steps in terminal treatment for the extrusion to which double-sided adhesive tape is to be stuck are reduced to attain high manufacturing efficiency with laborsaving.

It is another object of the invention to provide a terminal-treated extrusion having the structure in which efficiency for application of double-sided adhesive tape is heightened.

To attain the foregoing objects, according to an aspect of the invention, a method of terminal treatment for an extrusion molding comprises the steps of: applying double-sided adhesive tape to necessary positions of an extrusion molding; cutting said extrusion molding with said double-sided adhesive tape stuck thereon into a necessary length; cutting a release paper of said double-sided adhesive tape into a predetermined length less than said necessary length of said extrusion; and forming a terminal of said extrusion into a predetermined form by injection molding.

In the present invention, a continuous extrusion is first formed by extrusion molding, and then double-sided adhesive tape is continuously applied to the continuous extrusion in the adhesive tape applying step to prepare a continuous extrusion having double-sided adhesive tape applied thereto. The thus prepared extrusion is cut into a predetermined length in the extrusion cutting step, and then the double-sided adhesive tape is cut off in the double-sided adhesive tape cutting step to thereby attain an adhesion-effective length. At the same time, an end portion of the double-sided adhesive tape is treated so as not to interfere with adhesion. Lastly, a terminal of the extrusion is reformed into a predetermined form by injection molding.

According to another aspect of the present invention, a terminal-treated extrusion comprises: an extrusion molding continuously formed by extrusion molding; double-sided adhesive tape applied to necessary positions of the bottom of said extrusion to thereby extend with an adhesion-effective length on said extrusion; and a terminal formed by injection molding, said terminal being formed at portion which does not correspond to said adhesion-effective length of said double-sided adhesive tape, wherein a thickness of said terminal from said bottom of said extrusion is equal to or less than a thickness of adhesive agent of said double-sided adhesive tape changed due to adhesion pressure.

In the present invention, the extrusion, such as a non-hollow extrusion, a hollow extrusion and the like, continuously formed by extrusion molding and the double-sided adhesive tape applied to necessary positions of the bottom of the extrusion to cover the whole length of the extrusion can be continuously molded and applied, so that efficiency for applying double-sided adhesive tape to the extrusion can be improved. Further, by cutting the thus prepared extrusion, an extrusion of a predetermined length can be produced. Furthermore, a terminal is reformed by injection molding, by which the terminal is molded except for the adhesion-effective length of the double-sided adhesive tape such that the thickness of the terminal from the bottom of the extrusion is equal to or less than the thickness of the adhesive agent of the double-sided adhesive tape changed according to the adhesive agent sunk by adhesive pressure. Accordingly, terminal treatment can be applied to the extrusion to which the double-sided adhesive tape is applied at its adhesion-effective length. Consequently, it is possible to simplify the manufacturing process and to improve the efficiency in application of the double-sided adhesive tape.

DETAILED DESCRIPTION OF THE INVENTION

Referring to the drawings, preferred embodiments of the present invention will be described hereunder.

Figure 1:
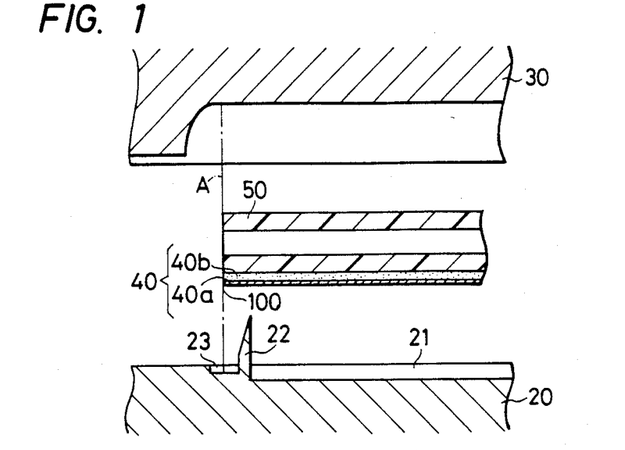
FIG. 1 is a partial sectional view of metal molds and an extrusion used in the method of terminal treatment for an extrusion as an embodiment of the present invention.
Figure 2A:
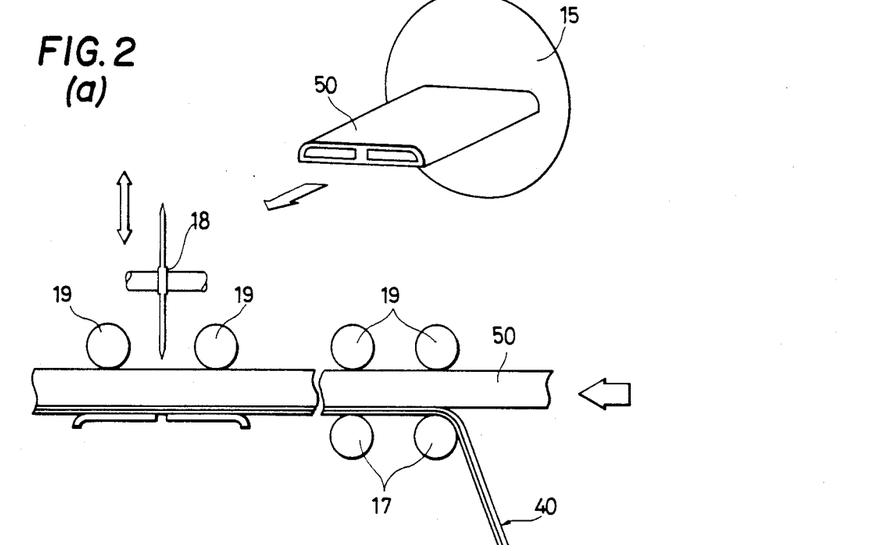
FIGS. 2(a) and 2(b) are schematic views for explaining the process of producing a half-finished hollow molding to which double-sided adhesive tape is applied.
Figure 2B:
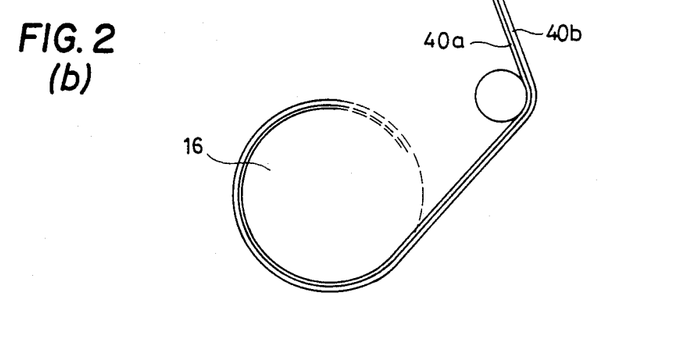

FIG. 1 is a sectional view in part of metal molds and an extrusion used in the method of terminal treatment for an extrusion as an embodiment of the present invention. FIGS. 2(a) and 2(b) are schematic views explaining the process of producing a half-finished hollow molding to which double-sided adhesive tape is applied.

In FIG. 2(a), a half-finished hollow molding 50 is continuously formed by extrusion from an extrusion metal mold 15 in the extrusion molding step. In FIG. 2(b), the half-finished hollow molding 50 thus continuously formed is treated in the adhesive tape applying step, so that double-sided adhesive tape 40 fed from a tape drum 16 is continuously applied to necessary positions of the molding 50 with pressure rollers 17. The double-sided adhesive tape 40 continuously applied to the continuously molded half-finished hollow molding 50 is fed by feed rollers 19, and then cut into a necessary length by a cutter 18 in the extrusion cutting step to thereby prepare a half-finished hollow molding 50 having double-sided adhesive tape 40 attached thereto.

In FIG. 1, the half-finished hollow molding 50, as an extrusion, is produced by continuous extrusion of a long-scale hollow molding formed of nonrigid vinyl chloride or the like in the aforementioned extrusion molding step.

In the adhesive tape applying step, two strips of double-sided adhesive tape 40 are continuously attached parallel to each other at two places of the lower surface of the continuously molded half-finished hollow molding 50, so that release paper 40a is provided at the lower surface of the double-sided adhesive tape 40. After the half-finished hollow molding 50 having double-sided adhesive tape 40 attached thereto is put between a male metal mold 20 and a female metal mold 30, the process is shifted to the injection molding step for reforming a terminal of the extrusion or extruded article into a predetermined form by injection molding.

Figure 3:
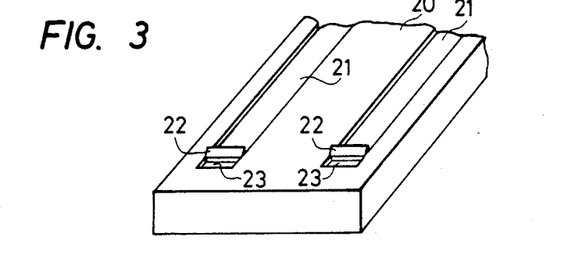
FIG. 3 is a perspective view in part of a metal mold used in the method of terminal treatment for an extrusion according to the embodiment of the present invention.
Figure 4:
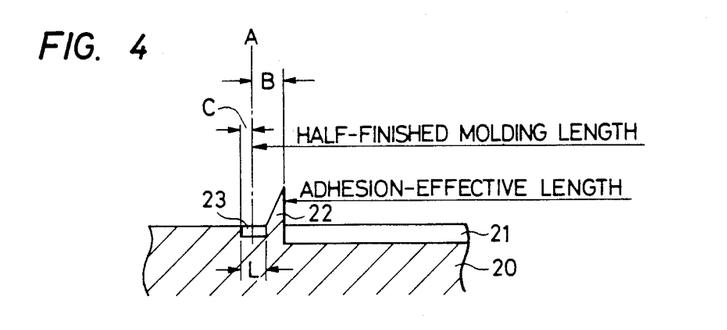
FIG. 4 is a sectional view in part of the metal mold in FIG. 3.

As shown in FIGS. 1, 3 and 4, the male metal mold 20 used in the injection molding step has two parallel grooves 21 which are wide and deep enough to house the double-sided adhesive tape 40 and are slightly shorter than the half-finished hollow molding 50. Further, the male metal mold 20 has projections 22 for cutting release paper on the adhesive paper. The projections 22 is disposed at positions opposed to the molding set on the mold 20 such that the projections 22 are placed at a distance B from the molding-set reference position A where an end portion 100 of the half-finished hollow molding 50 is set. In short, the projections 22 form end portions of the grooves 21. The fact that the length of the grooves 21 is slightly shorter than that of the half-finished hollow molding 50, is necessary to the case where the opposite ends of the half-finished hollow molding 50 are to be simultaneously reformed. Generally, the relation between the molding-set reference position A and the position of the release paper cutting projections 22 is limited by the variation of length of the half-finished hollow molding 50, as follows. Accordingly, the release paper cutting projections 22 are disposed at a predetermined distance B a little away toward the molding from the molding-set reference position A so that the variation in length can be neglected in the case where half-finished hollow molding 50 is set a little inward away from the molding-set reference position A.

Figure 10A:
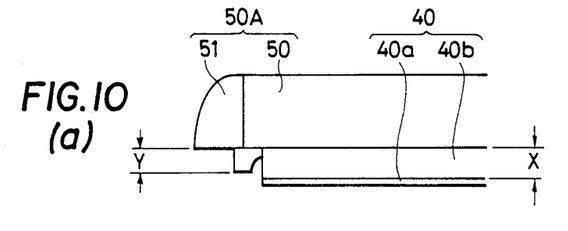
FIGS. 10(a) through 10(c) show a process in which the finished extrusion from the injection molding step is attached to an object of attachment.
Figure 10B:
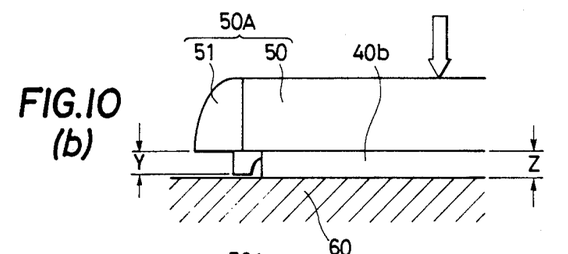
Figure 10C:
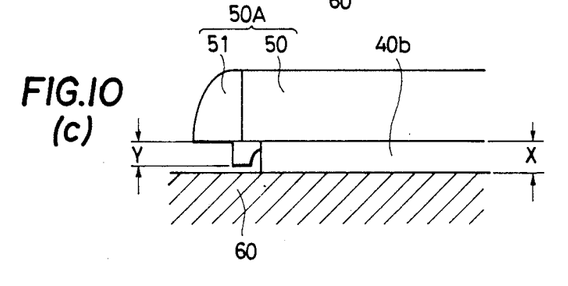

Further, the male metal mold 20 has correcting grooves 23 of a length L which are provided opposite to the grooves 21 with respect to the double-sided adhesive tape cutting projections 22. The depth of the correcting grooves 23 is less than that of the grooves 21. The depth of the grooves 21 is established to be not less than the thickness of the double-sided adhesive tape 40 including the thickness of the release paper 40a. That is, as shown in FIG. 10, the depth of the correcting grooves 23 is established to be Y which is almost equal to or less than Z calculated by subtracting the thickness change of the adhesive agent 40b from the thickness X of the adhesive agent 40b of the tape 40 from which the release paper 40a is released in the case where the thickness X of the adhesive agent 40b of the double-sided adhesive tape 40 is changed according to pressure generated in the adhesive agent 40b necessary for the agent 40b to stick to an object 60. The outer ends of the correcting grooves 23 are determined such that the outer ends of the groove 23 will not face the molding 50 set on the mold 20. That is, the outer ends of the grooves 23 are at a predetermined distance C from the molding-set reference position A so that the variation in length can be neglected in the case where the half-finished hollow molding 50 is set a little outward away from the molding-set reference position A, as shown in FIG. 4.

The female metal mold 30 used in the injection molding step is formed so that the half-finished hollow molding 50 is pressed or held between the upper surface of the male metal mold 20 and the inner surface of the female metal mold 30. More particularly, as shown in FIG. 5, a cavity 51a which coincides with the form of a terminal 51 to be added to the half-finished hollow molding 50, is formed at an end portion of the female metal mold 30.

Figure 5:
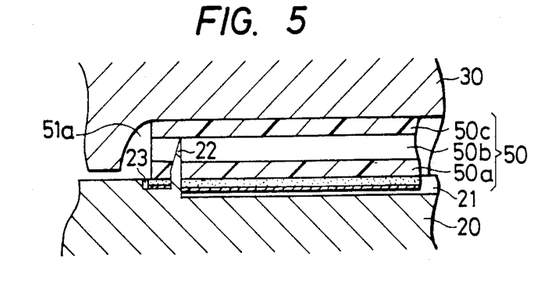
FIG. 5 is a sectional view in part showing the double-sided adhesive tape cutting step in the method of terminal treatment of an extrusion according to the present invention.

As shown in FIG. 5, the thus formed male and female metal molds 20 and 30 are pressed to each other with the half-finished hollow molding 50 being put therebetween, and then the step of cutting the double-sided adhesive tape 40 including release paper 40a into a predetermined length less than the necessary length of the extrusion to be obtained starts prior to the injection molding step.

More particularly, in the double-sided tape cutting step, the release paper cutting projection 22 of the male metal mold 20 cuts the paper 40a and is lifted to reach a hollow portion 50b or upper portion 50c after cutting the bottom portion 50a of the half-finished hollow molding 50. In this condition, the hollow portion 50b of the half-finished hollow molding 50 is perfectly closed or almost perfectly closed with an opening being formed, by the double-sided adhesive tape cutting projection 22 of the male metal mold 20. This condition is suitable for injection of resin into the cavity 51a shown in FIG. 5 surrounded by the male and female metal molds 20 and 30 and the double-sided adhesive tape cutting projection 22.

Figure 6:
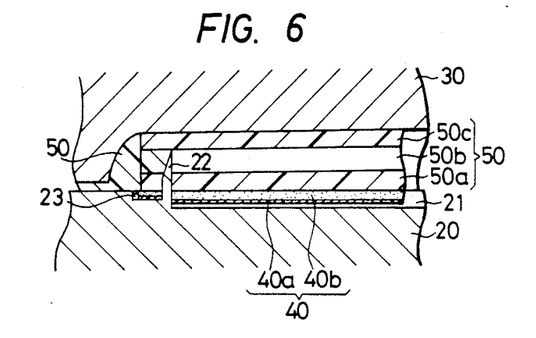
FIG. 6 is a sectional view in part showing the injection molding step in the method of terminal treatment of an extrusion according to the present invention.

FIG. 6 shows the condition that resin is injected into the cavity 51a formed by the male and female metal molds 20 and 30 and the double-sided adhesive tape cutting projection 22, which are in the state shown in FIG. 5, to provide the terminal 51 to the extrusion molding 50.

Figure 7:
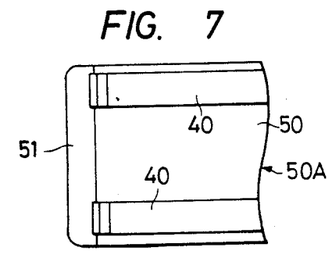
FIG. 7 is a bottom view in part of the molding in which the terminal is treated by the method of the present invention.
Figure 8:
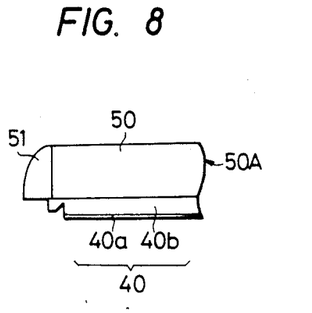
FIG. 8 is a side view in part of the molding in which the terminal is treated by the method of the present invention.

Thus, the injection molding step for providing the terminal in a predetermined form to the half-finished hollow molding 50 is finished. That is, molding of the terminal 51 of the half-finished hollow molding 50 is finished, so that a terminal-treated hollow molding 50A can be obtained as shown in the partially bottom view of FIG. 7 and the partially side view of FIG. 8.

The operations of the grooves 21, double-sided adhesive tape cutting projections 22 and correcting grooves 23 will be described in more detail with reference to FIG. 9.

In the male metal mold 20 used in the injection molding step, the groove 21 which is slightly shorter than the predetermined length of the half-finished hollow molding 50, is wide and deep enough to house the width of the double-sided adhesive tape 40. Because the length of the groove 21 is slightly shorter than that of the half-finished hollow molding 50, the release paper 40a of the double-sided adhesive tape 40 can be cut by the double-sided adhesive tape cutting projection 22 and, further, the amount of resin injected into the hollow portion 50b of the half-finished hollow molding 50 can be determined. Further, because the groove 21 is wide and deep enough to house the double-sided adhesive tape 40, escape of the double-sided adhesive tape 40 is established so that the half-finished hollow molding 50 can be positioned easily and accurately to the male and female metal molds 20 and 30 when the terminal 51 of the half-finished hollow molding 50 is produced. Accordingly, the depth of the groove 21 for housing the double-sided adhesive tape 40 is established to be almost not less than the thickness of the double-sided adhesive tape 40 inclusive of the release paper 40a and the adhesive agent 40b.

Furthermore, the correcting grooves 23 provided opposite to the grooves 21 with respect to the double-sided adhesive tape cutting projections 22 has a depth less than that of the grooves 21. The depth of the grooves 23 is established, more accurately, to be less than the value calculated by subtracting the change in thickness of the adhesive agent 40b from the thickness of the adhesive agent 40b in the case where the thickness of the adhesive agent 40b of the double-sided adhesive tape 40 will be changed according to pressure applied to the double-sided adhesive tape for an object of attachment after releasing the release paper 40a. In other words, as shown in FIG. 10, the depth Y of the correcting grooves 23 is established to be equal to or less than the value calculated by subtracting the change in thickness of the adhesive agent 40b from the thickness X of the adhesive agent 40b of the double-sided adhesive tape 40 from which the release paper 40a is released in the case where the thickness X of the adhesive agent 40b is changed according to the pressure generated in the adhesive agent 40b necessary for the tape 40 to stick to an object 60 for attachment.

Figure 9:
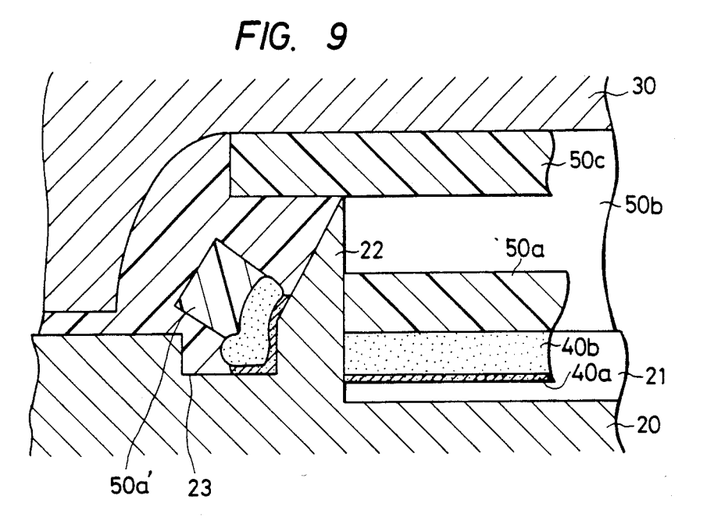
FIG. 9 is an explanatory view showing in detail the method of terminal treatment for an extrusion according to the present invention.

As shown in FIG. 9, when the double-sided adhesive tape cutting projection 22 is lifted to cut the bottom portion 50a of the half-finished hollow molding 50, fragment 50a' of the half-finished hollow molding 50a is pressed outward by the double-sided adhesive tape cutting projections 22, so that the fragment 50a' may be in a state as shown in FIG. 9 according to the circumstances. Or, in the case where the fragment 50a' is small, the double-sided adhesive tape 40 included in the fragment 50a' may be floated so that resin for injection molding may be injected between the release paper 40a and the bottom of the correcting groove 23. Or, the end portion of the half-finished hollow molding 50 is generally disposed almost at the center of the correcting groove 23, since the correcting groove 23 is provided to absorb the error in length of the half-finished hollow molding 50. Accordingly, the resin for injection molding may be injected between the end portion of the half-finished hollow molding 50 and the wall of the correcting groove 23.

In those cases, if a molding piece formed in the correcting groove 23 to project from the bottom of the terminal 51 is not removed after injection molding, attachment of the hollow molding may be incomplete owing to the molding piece formed in the correcting groove 23 when the terminal-treated hollow molding will be attached to an object with the adhesive agent 40b of the double-sided adhesive tape 40. Therefore, as described above, the depth of the correcting groove 23 is established to be Y equal to or less than the thickness Z of the double-sided adhesive tape after the release paper 40a thereof is released and the adhesive agent 40b thereof is changed according to the adhesion thereof. Consequently, it is a matter of course that the depth of the correcting groove 23 is less than that of the groove 21 disposed opposite to the correcting groove 23 and in the male metal mold 20.

Although according to the aforementioned embodiment, the vertical surface of the release paper cutting projection 22 is provided in the reverse side which does not face the end portion of the half-finished hollow molding 50, the invention is applicable to the case where the vertical surface of the double-sided adhesive tape cutting projection 22 is in a side facing the end portion of the half-finished hollow molding 50 so that the influence of thickness of the release paper cutting projection 22 on the fragment 50a' can be reduced as much as possible.

Further, recessed grooves may be provided for necessary positions on the half-finished hollow molding 50 where the double-sided adhesive tape 40 is applied so that part of the double-sided adhesive tape 40 can be embedded in the recessed grooves. Particularly, the depth of the recessed grooves may be established to be almost equal to or less than the change in thickness of the adhesive agent 40b generated due to the pressure which is applied between the adhesive agent 40b and the object of attachment to make the adhesive agent stuck to the object after releasing the release paper 40a. As a result, it is possible that the resulting surface of the double-sided adhesive tape 40 is put in the same plane as the lower surface of the half-finished hollow molding 50 continuously formed by extrusion molding.

The extrusion thus completely reformed in the injection molding step is attached to the object 60 of attachment of the hollow molding 50A as shown in FIGS. 10(a), 10(b) and 10(c).

FIG. 10(a) shows the finished hollow molding 50A as an extrusion completely reformed in the injection molding step, and FIG. 10(b) shows the condition that the hollow molding 50A is pressed to be attached to the object 60 of attachment after the release paper 40a is released from the double-sided adhesive tape 40 applied to the whole length of the lower surface of the half-finished hollow molding 50. In this condition, the thickness X of the adhesive agent 40b is changed to be thickness Z formed by subtracting the change in thickness of the adhesive agent 40b according to the pressure necessary for the adhesion. However, the adhesion can be completed without limitation of the pressure by the molding piece of the fragment 50a' which is formed in the correcting groove 23 to project from the bottom of the molding 50, since the depth of the correcting groove 23 is established to be almost equal to or less than the thickness Z of the double-sided adhesive tape after the release paper 40a thereof has been released and the adhesive agent 40b thereof has been changed according to the adhesion thereof. Accordingly, there is no possibility of the adhesion being incomplete owing to the molding piece formed in the correcting groove 23 so as to project from the bottom of the molding 50. Consequently, an excellent adhesion condition can be attained as shown in FIG. 10(c).

As described above, the method of terminal treatment for an extrusion according to the embodiment of the invention comprises the steps of: forming an extrusion, such as a half-finished hollow molding 50 or the like, by extrusion molding; applying double-sided adhesive tape 40 to necessary position of the extrusion; cutting the extrusion, inclusive of the double-sided adhesive tape 40, into a necessary length; cutting the double-sided adhesive tape 40 into a predetermined length less than the necessary length of the extrusion, for the purpose of cutting release paper 40a of the double-sided adhesive tape; and forming a terminal 51 of the extrusion in a predetermined form by injection molding. In other words, a continuous extrusion is first formed by extrusion molding, and then double-sided adhesive tape is continuously applied to the continuous extrusion in the adhesive tape applying step to prepare a continuous extrusion having double-sided adhesive tape 40 applied thereto. The thus prepared extrusion is cut into a predetermined length in the extrusion cutting step, with simultaneously cutting off the double-sided adhesive tape 40 in the double-sided adhesive tape cutting step to thereby attain an adhesion-effective length. At the same time, an end portion of the double-sided adhesive tape is treated so as not to interfere with adhesion Lastly, a terminal 51 of the extrusion is formed into a predetermined form by injection molding.

Further, the terminal-treated extrusion according to the embodiment of the present invention comprises: an extrusion formed by continuous extrusion molding; double-sided adhesive tape 40 applied to necessary positions of the bottom of the extrusion to thereby cover the whole length of the extrusion; and a terminal 51 formed by injection molding, by which the terminal is formed at portion which does not correspond to the adhesion-effective length of the double-sided adhesive tape 40 so that the thickness of the terminal from the bottom of the extrusion is equal to or less than the thickness of the double-sided adhesive agent 40b changed according to the adhesive agent 40b sunk due to adhesion pressure.

Accordingly, since the double-sided adhesive tape 40 is continuously applied to the extrusion which has been continuously formed by extrusion molding, the process for applying the double-sided adhesive tape 40 of a predetermined length is simplified so that attachment can be made accurately without use of specific precision machines for applying double-sided tape and without assistance.

Particularly, in the case where the step of cutting the double-sided adhesive tape 40 into a predetermined length less than the necessary length of the extrusion to thereby cut the release paper 40a inward is carried out prior to the step of providing the terminal 51 in a predetermined form to the extrusion by injection molding, the number of steps can be reduced.

Further, since the cutter used in the step of cutting the double-sided adhesive tape 40 into a predetermined length less than the necessary length of the extrusion to thereby cut the release paper 40a inward is included in the injection mold used in the step of forming the terminal of the extrusion in a predetermined form by injection molding, the process can be saved as well as the apparatus used both in the double-sided adhesive tape cutting step and in the injection molding step can be saved. Further, since the extrusion is treated at portion which does not correspond to the adhesion-effective length of the double-sided adhesive tape 40 in order not to give influence to the adhesion-effective length, injection molding can be carried out without separating the double-sided adhesive tape 40 from the extrusion. Consequently, laborsaving can be attained.

In this embodiment, the cutter used in the step of cutting the double-sided adhesive tape 40 into a predetermined length less than the necessary length of the extrusion to thereby cut the release paper 40a inward is a double-sided adhesive tape cutting projection 22 of the male metal mold 20 which reaches to a hollow portion 50b or upper portion 50c to cut a bottom portion 50a of the half-finished hollow molding 50 after cutting the release paper 40a. The hollow portion 50b of the half-finished hollow molding 50 is perfectly closed or almost perfectly closed with a gap, by the double-sided adhesive tape cutting projection 22 of the male metal mold 20. This condition is suitable for injection of resin into the cavity 51a surrounded by the male and female metal molds 20 and 30 and the double-sided adhesive tape cutting projection 22.

However, when the invention is realized in practice, any modification may be made.

For example, a means of sealing the hollow portion 50b of the half-finished hollow molding 50 may be used under the conditions that the double-sided adhesive tape cutting projection 22 of the male metal mold 20 has only the function of cutting the double-sided adhesive tape 40 or the function of cutting the release paper 40a. Particularly, in the case where the double-sided adhesive tape cutting projection 22 is used singularly for cutting the release paper 40a from the reason that the adhesive agent 40b of the double-sided adhesive tape 40 is too elastic to cut, dull material can be used as the double-sided adhesive tape cutting projection 22. On the other hand, in the afore-mentioned case where the double-sided adhesive tape cutting projection 22 reaches to the hollow portion 50b or upper portion 50c after cutting the release paper 40a and the bottom portion 50c of the half-finished hollow molding 50 successively, the double-sided adhesive tape 40 can be perfectly cut off because occasion to cut the adhesive agent 40b having elasticity comes when the projection 22 cuts the bottom portion 50a or touches the upper portion 50c even though the projection 22 is dull.

Furthermore, although the aforementioned embodiment shows the case where the half-finished hollow molding 50 is used as an extrusion, it is to be understood that the invention is not limited to the specific embodiment and that the invention can be applicable to the case where any extrusion, for example a non-hollow extrusion not having such a hollow portion 50b, is used as long as at least the release paper 40a can be cut by the double-sided adhesive tape cutting projection 22 of the male metal mold 20. In short, various types of extrusions, such as hollow extrusions, non-hollow extrusions and the like, can be used in this invention.

As described above, the method of terminal treatment for an extrusion according to the invention comprises the steps of: forming an extrusion by extrusion molding; applying double-sided adhesive tape to necessary positions of the extrusion; cutting the extrusion, inclusive of the double-sided adhesive tape, into a necessary length; cutting the double-sided adhesive tape into a predetermined length less than the necessary length of the extrusion, for the purpose of cutting release paper of the double-sided adhesive tape; and forming a terminal of the extrusion in a predetermined form by injection molding. Accordingly, efficiency for applying the double-sided adhesive tape to the extrusion, such as a hollow extrusion, a non-hollow extrusion or the like, can be improved by the continuous molding and the application of the continuous adhesive tape. Further, the extrusion inclusive of the adhesive tape is cut in the double-sided tape cutting step to attain a predetermined length of the extrusion and an effective length of the double-sided adhesive tape, and then the terminal is formed by injection molding in the injection molding step. Accordingly, the number of steps for terminal treatment of the extrusion can be reduced to thereby attain laborsaving and high efficiency.

Furthermore, the terminal-treated extrusion according to the present invention comprises: an extrusion formed by extrusion molding; double-sided adhesive tape applied to necessary positions of the bottom of the extrusion to thereby extend with the adhesion-effective length on the extrusion; and a terminal formed by injection molding, terminal being formed at a portion not corresponding to the adhesion-effective length of the double-sided adhesive tape so that the thickness of the terminal from the bottom of the extrusion is less than the thickness of the adhesive agent of the adhesive tape changed according to the adhesive agent sunk by adhesion pressure. Accordingly, terminal treatment can be applied to the extrusion according to the adhesion-effective length of the double-sided adhesive tape. Consequently, it is possible to simplify the manufacturing process and to improve the efficiency for application of the double-sided adhesive tape.

What is claimed is:

1. A method of terminal treatment for an extrusion molding article, comprising the steps of:
    extrusion molding an article;
    applying a double-sided adhesive tape to a rear side of the extrusion molded article at a predetermined position;
    cutting the extrusion molded article into a predetermined length together with the adhesive tape stuck to the article;
    placing the extrusion molded article cut into the predetermined length in an injection molding mold, the injection molding mold including an adhesive tape accommodating groove and a projection for cutting the adhesive tape, the tape accommodating groove having a width and a depth equal to or larger than the width and the depth of the adhesive tape, respectively, and having a length a little smaller than that of the extrusion molded article, the projection being provided in the molding die at an end portion of the tape accommodating groove;
    cutting, with the projection, the adhesive tape stuck to the extrusion molded article and the extrusion molded article at a portion which is spaced by a small amount from the end portion of the extrusion molded article when the mold is closed to form a cavity of predetermined shape for molding a terminal for the extrusion molded article; and
    injecting resin into said cavity of the mold to injection mold a terminal of predetermined shape for the extrusion molded article whereby said projection prevents injected resin from flowing into the adhesive tape.

2. A method of terminal treatment for an extrusion, according to claim 1, in which said extrusion formed by extrusion molding is not in hollow shape.

3. A method of terminal treatment for an extrusion, according to claim 1, in which said extrusion formed by extrusion molding is in hollow shape.

4. A method of terminal treatment for an extrusion molded article according to claim 1, wherein the injection molding mold includes a correction groove having a depth smaller than that of the tape accommodating groove and a predetermined length, the correction groove extending from the projection in a direction apart from the tape accommodating groove.

5. A method of terminal treatment for an extrusion molding article according to claim 4, wherein the correction groove has a depth equal to or smaller than a value obtained by subtracting from the thickness of the adhesive agent the change in thickness of the adhesive agent of the adhesive tape which is caused by the adhesion pressure.

* * * * *